(12) United States Patent
Nickolai

(10) Patent No.: US 6,205,394 B1
(45) Date of Patent: Mar. 20, 2001

(54) AUTOMATIC ENGINE POWER CONTROL SYSTEM FOR MOTOR VEHICLES HAVING A POWER CONTROL ELEMENT

(75) Inventor: Norbert Nickolai, Laufen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/326,552

(22) Filed: Jun. 7, 1999

(30) Foreign Application Priority Data

Jun. 5, 1998 (DE) .............................................. 198 25 283

(51) Int. Cl.$^7$ .............................. F02D 41/22; G06F 19/00
(52) U.S. Cl. ......................... 701/107; 701/110; 701/115
(58) Field of Search .................................. 123/396, 399; 701/102, 103, 107, 110, 115

(56) References Cited

U.S. PATENT DOCUMENTS

| | | |
|---|---|---|
| 5,204,816 * | 4/1993 | Wright et al. .......................... 701/107 |
| 5,233,530 * | 8/1993 | Shimada et al. ....................... 701/107 |
| 5,247,444 * | 9/1993 | Arai et al. ............................. 701/107 |
| 5,999,875 * | 12/1999 | Bruedigam et al. .................. 701/110 |
| 6,067,498 * | 5/2000 | Akiyama ............................... 701/110 |

* cited by examiner

Primary Examiner—Willis R. Wolfe
(74) Attorney, Agent, or Firm—Evenson, McKeown, Edwards & Lenahan, P.L.L.C.

(57) ABSTRACT

An automatic engine power control system for a motor vehicle has a power control element which is uncoupled from the operation of the vehicle accelerator pedal, and can be controlled as a function of various operating parameters by means of an electronic control unit. In the event of a failure, an emergency driving mode is implemented with a power which is reduced by defining a maximum permissible engine torque. When the driver's power demand is increased during an emergency driving mode, the power is automatically controlled by means of the power control element such that, at the point in time of the increase of the power demand, an immediate acceleration is initiated, and if the increased power demand is maintained, a defined acceleration course is implemented until the maximum permissible engine torque is reached.

4 Claims, 2 Drawing Sheets

AUTOMATIC ENGINE POWER CONTROL SYSTEM FOR MOTOR VEHICLES HAVING A POWER CONTROL ELEMENT

BACKGROUND AND SUMMARY OF THE INVENTION

This application claims the priority of German patent document 198 25 283.8, filed Jun. 5, 1999, the disclosure of which is expressly incorporated by reference herein.

The invention relates to an automatic engine power control system for motor vehicles having a power control element which can be controlled by an electronic control unit, as a function of various vehicle operating parameters.

In known automatic electronic engine power control systems (also called "E-gas") of this generic type, in contrast to the previously customary mechanical adjustment of a power control element (such as a throttle valve) by way of a Bowden control, an electronic control unit operates the power control element preferably by means of an electric motor. The system is therefore capable of controlling the power control element (for example, the throttle valve in the case of Otto engines, or the injection in the case of diesel engines) as a function of various operating parameters in order to carry out, for example, an engine torque reduction for the automatic wheel slip control. In this case, a pedal travel sensor normally detects the accelerator pedal position and supplies a corresponding electric signal to the electronic control unit. Based thereon, the control unit calculates a triggering signal for (e.g) the throttle valve adjuster, also taking into account the input signals of additional systems, such as an automatic wheel slip control systems and/or an automatic engine control system. Continuous examination of all components by the control unit ensures the perfect functioning of the system. Preferably, redundant sensors and computers of the control unit are provided in order to permit a reliable plausibility check by comparison of the respective signals. As technical background, see, for example, the newspaper article "Concept of the Electronic System of the BMW 12-Cylinder Engine", Automobilindustrie No. 1/88, Pages 19, and on.

If one of the two paths fails, the plausibility check can no longer take place. Nevertheless, in order to increase the availability of the vehicle, continued driving is permitted in an emergency mode, in which engine power is limited to a maximum permissible engine torque value, and the vehicle dynamics are also limited. When the power demand input by the driver is increased during emergency driving (for example, when gas is given again after the accelerator pedal was released during a shifting operation), engine torque is released in a controlled manner by way of a defined ramp in steps to the maximum permissible engine torque, irrespective of the resulting course of the vehicle speed or of the acceleration. The resulting acceleration course on the basis of the fixed engine torque ramp is a function of vehicle parameters, engine parameters and the gear position.

The fixed ramp is designed for a certain operating point, particularly for the worst case, and as a result, the desired minimum dynamics are not available in any other operating points. Because the defined ramp always begins again at the lowest value when the power demand is subsequently increased after release of the accelerator pedal by the driver, delay times occur after each load change relative to the acceleration. Such delays are unsatisfactory for the driver.

It is an object of the invention, to provide an automatic engine control system of the initially mentioned type, which achieves improved vehicle dynamics during the emergency driving.

This and other objects and advantages are achieved by the automatic power control system according to the invention, which is based on the recognition, that, for the driver, the feeling for the vehicle dynamics is connected directly with the acceleration behavior of the vehicle. Therefore, according to the invention, emergency driving is based on actual vehicle acceleration, rather than on engine torque as in the prior art. The invention provides an automatic control of the power control element such that, when the power demand is increased, an immediate acceleration is initiated without any (noticeable) delay. Also, in the event that the increased power demand is maintained, a defined, preferably dynamically acting acceleration course is obtained until the maximum permissible engine torque is reached.

For reasons of safety, when the brake is operated, acceleration is stopped irrespective of the power demand, and the internal-combustion engine is changed to idling operation.

Other objects, advantages and novel features of the present invention will become apparent from the following detailed description of the invention when considered in conjunction with the accompanying drawings.

DETAILED DESCRIPTION OF THE DRAWINGS

Figure 1:
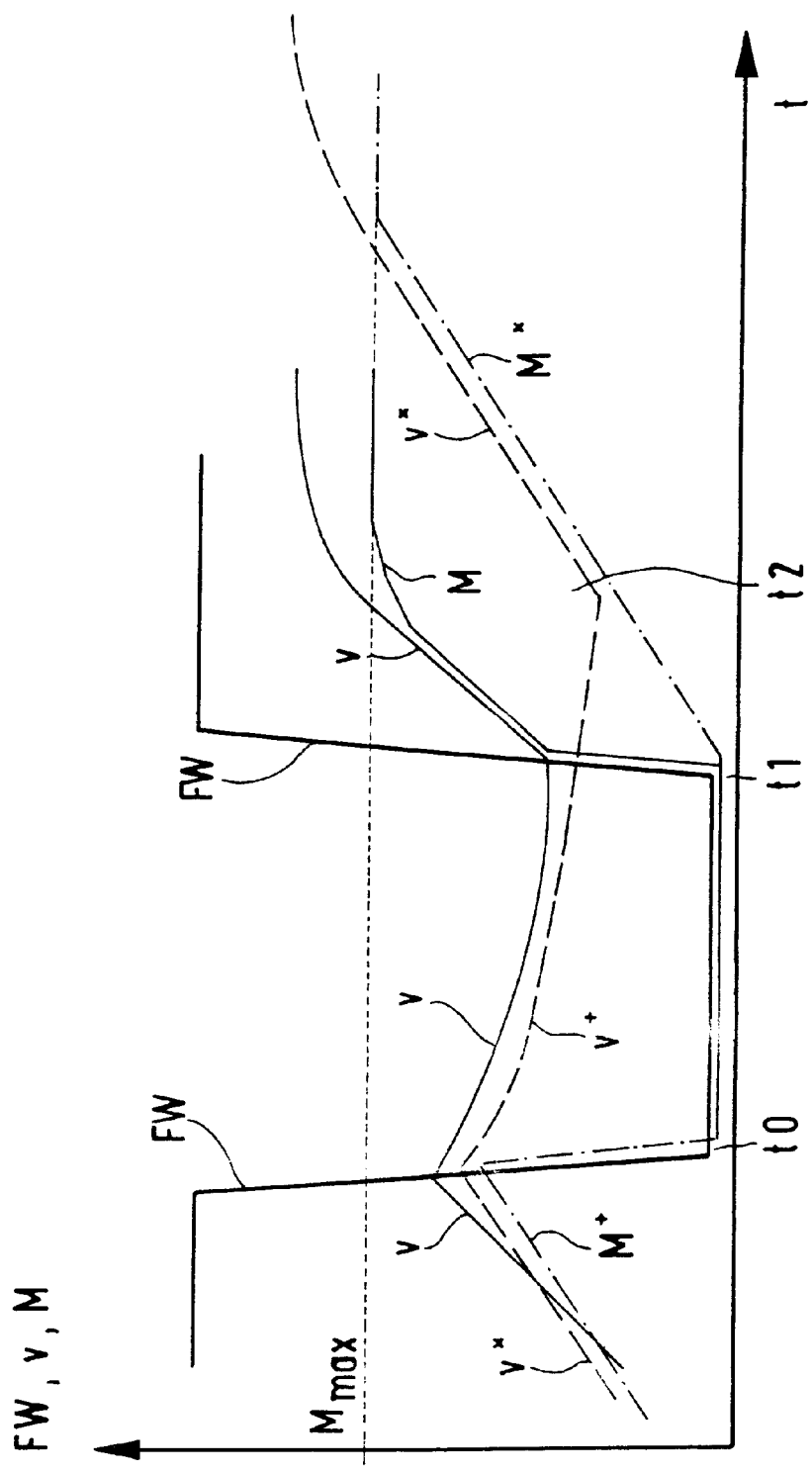
FIG. 1 shows the resulting acceleration courses according to the state of the art and according to the invention.

FIG. 1 illustrates the variation over time t of the power demand FW during an emergency driving mode, as well as, the corresponding defined acceleration in the form of a speed curve v. and the engine torque M resulting from the automatic control of the power control element, also corresponding to the defined speed course v. Before the point in time t0, the driver has demanded maximum power, for example, by completely depressing the accelerator pedal. At the point in time t0, the accelerator pedal is released completely (for example, because of a planned changing of gears), and the power demand FW falls to the 0 value. At the point in time t1 (for example, after a gear change), the accelerator pedal is again completely depressed, whereby maximum power FW is again demanded by the driver. Because of a failure recognized by the control unit (not illustrated), an emergency driving mode exists at reduced power. Thus, maximum permissible engine torque $M_{max}$ (dotted line in FIG. 1) is defined by the electronic control unit.

According to the invention, at the point in time t1, the power control element is automatically controlled to generate an engine torque M by means of which, on the one hand, an immediate acceleration is obtained and, on the other hand, the defined speed course v is achieved. Although automatic control of the power control element is limited by the defined maximum permissible engine torque $M_{max}$, an immediate and noticeable acceleration is provided from the point in time t1 until the maximum permissible engine torque $M_{max}$, is achieved. As a result, a dynamic feeling can be provided.

In order to demonstrate the effect of the automatic engine power control according to the invention, FIG. 1 also shows, for the purpose of comparison, the controlled torque course M* (dash-dotted line) and the resulting acceleration course or speed course v* (broken line) according to the state of the art. At the point in time t1, in response to the increased power demand FW, an engine torque M* controlled according to a defined ramp, without consideration of the acceleration or speed response v*. Particularly between the points in time t1 and t2, the defined ramp does not correspond to the increased power demand, so that until time t2, no (positive) acceleration, but rather a reduction of the vehicle speed v*, occurs. Only at point t2 does the vehicle speed v* rise again, and only on the one hand, in a delayed manner and, on the other hand, with a gradient which is smaller than in the case of the automatic engine power control according to the invention. This non-dynamic behavior may be unpleasant to the driver.

Figure 2:
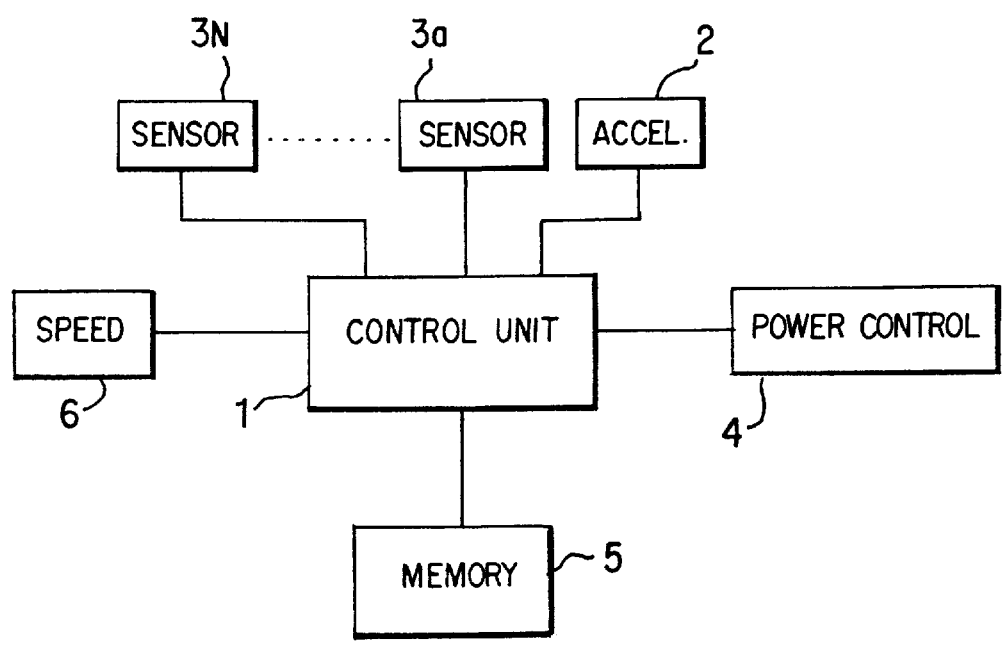
FIG. 2 shows a schematic block diagram of an automatic engine power control system according to the invention.

FIG. 2 is a schematic block diagram which illustrates an engine power control system for implementing the present invention. An electronic control unit 1 receives inputs from an accelerator pedal position sensor 2 as well as from a plurality of additional sensors 3a–3n, such as for example, an automatic wheel slip control or an automatic engine control. Based on these inputs, the control unit 1 generates a signal which controls operation of the power control element 4.

As noted previously, when the control unit 1 detects a malfunction in the vehicle systems, such as a failure of redundant sensors or computers which render the vehicle control less certain, it implements an emergency driving mode in which engine torque is limited to a maximum value stored in the memory 5. In the control system according to the invention, memory 5 also has stored therein a predefined acceleration curve which is used by control unit 1 to control vehicle acceleration as determined based on signals from a vehicle speed sensor 6. For this purpose, the control unit 1 adjusts the power control element 4 to generate an engine torque which achieves the desired acceleration according to the predefined curves stored in the memory 5. In this manner, an immediate and noticeable acceleration is achieved and maintained until the maximum permissible engine torque is generated.

In the automatic engine control system according to the invention, by controlling vehicle operation according to a defined acceleration or speed course (as opposed to control based only on torque, as in the prior art), the acceleration behavior is independent of the type of driver, the type of motor and the engaged gear. The required power for a continued driving is available at every operating point. This behavior has a particularly positive effect during shifting operations (manual shifting), uphill driving and trailer operations. Conventional emergency driving strategies cannot be coordinated therewith and therefore represent an unsatisfactory solution.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An automatic engine control system for a motor vehicle having an engine and a power control element for controlling engine operation, said control system comprising:

an accelerator pedal position sensor for sensing a vehicle operator's power demand;

at least one additional sensor for detecting at least one other vehicle operating parameter;

a speed sensor for detecting at least one of vehicle speed and acceleration; and an engine control unit coupled to receive inputs from said accelerator pedal position sensor, said at least one additional sensor and said speed sensor, for generating output signals for controlling said power control element in response to detected accelerator pedal position, said at least one other vehicle operating parameter and detected vehicle speed;

wherein in the event of a system failure detected by said control unit said control unit implements an emergency driving mode in which engine torque is limited to a defined maximum value; and when a vehicle operator's power demand is increased during the emergency driving, said engine control unit retrieves a redefined acceleration curve stored in a memory thereof, based on signals from said speed sensor, and adjusts the power control element to generate an engine torque course such that, a defined acceleration course takes place according to said retrieved acceleration course until the maximum engine torque is reached.

2. Engine power control system according to claim 1, wherein when a vehicle brake is operated, acceleration is terminated and the power control element is changed to achieve an idling operation of the internal-combustion engine.

3. An automatic engine control system for a motor vehicle having an engine and a power control element for controlling engine operation, said control system comprising:

an accelerator pedal position sensor for sensing a vehicle operator's power demand;

at least one additional sensor for detecting at least one other vehicle operating parameter;

a speed sensor for detecting at least one of vehicle speed and acceleration; and an engine control unit coupled to receive inputs from said accelerator pedal position sensor, said at least one additional sensor and said speed sensor, for generating output signals for controlling said power control element in response to detected accelerator pedal position, said at least one other vehicle operating parameter and detected vehicle speed; and a computer readable memory having stored therein at least a predefined target vehicle acceleration curve;

wherein in the event of a system failure detected by said control unit, said control unit adjusts said power control element to cause said engine to generate a torque which achieves a vehicle acceleration according to said target vehicle acceleration curve in response to a driver input demand for increased power, until a predetermined maximum torque value is achieved.

4. A method of controlling engine power in a vehicle having an engine and a power control element for controlling engine operation, said method comprising:

detecting an accelerator pedal position of said vehicle to determine a vehicle operator's demand for power;

detecting at least one other vehicle operating parameter;

controlling said control element in response to the vehicle operator's demand for power and in response to said at least one other operating parameter;

detecting a malfunction in the vehicle system;

detecting vehicle acceleration; and in response to a detected malfunction, controlling said control element to generate an engine torque which provides a vehicle acceleration according to a predefined vehicle acceleration characteristic in response to a driver input demand for increased power, until a predetermined maximum torque value is achieved.

* * * * *